(No Model.)

J. A. SHAFER.
WOODEN RAKE.

No. 400,259. Patented Mar. 26, 1889.

Witnesses.
A. Ruppert,
G. B. Towles.

Inventor,
James A. Shafer,
Per
Thomas P. Simpson
Atty

UNITED STATES PATENT OFFICE.

JAMES A. SHAFER, OF RICHMONDVILLE, NEW YORK.

WOODEN RAKE.

SPECIFICATION forming part of Letters Patent No. 400,259, dated March 26, 1889.

Application filed November 20, 1888. Serial No. 291,344. (No model.)

*To all whom it may concern:*

Be it known that I, JAMES A. SHAFER, a citizen of the United States, residing at Richmondville, in the county of Schoharie and State of New York, have invented certain new and useful Improvements in Wooden Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to secure the bows of a rake to the handle without materially weakening it, to make the rake last a long while, and to lessen the cost to the consumer or user.

Figure 1:
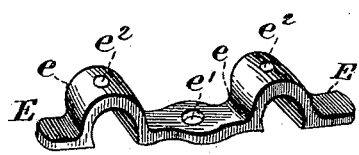
Figure 2:
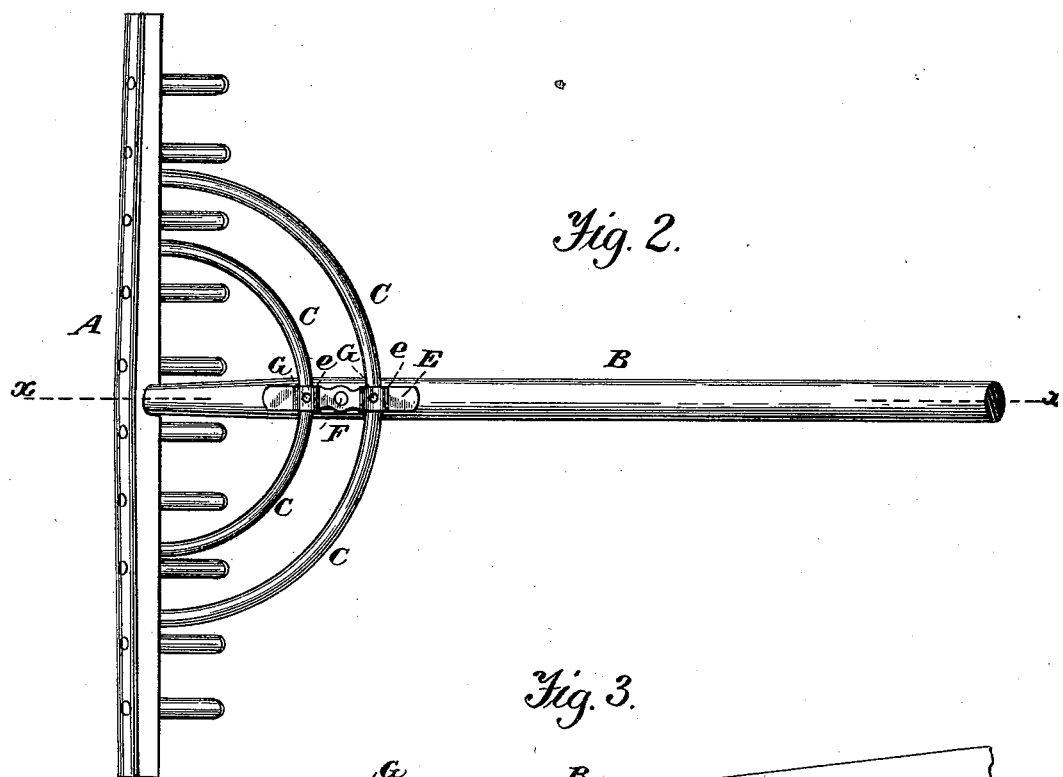
Figure 3:
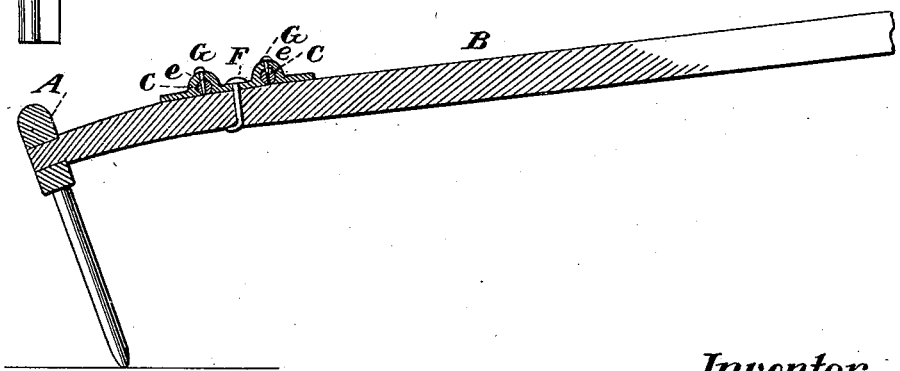

Figure 1 of the drawings is a detail view in perspective of my bow-clamp for wooden rakes; Fig. 2, a plan view of a rake with my improvement applied, and Fig. 3 a longitudinal vertical section on the dotted line $x$ $x$ of Fig. 2.

In the drawings, A represents a rake-head carrying the teeth usually employed, B a handle fitted in the middle of the rake-head, and C C bows which keep the rake-head at right angles to the handle D. These are, however, all old devices and not intended to be described as any part of my invention.

E is my bow-clamp, preferably made of a metallic plate or casting with the transverse bridges $e$ $e$, under which are held the bows C C.

$e'$ is a hole made in the middle of the clamp, and through this passes down vertically the handle-rivet F, this being the only fastening employed or required to hold the clamp and handle fixedly together.

$e^2$ $e^2$ are vertical holes in the highest part of the bridges $e$ $e$, and through these pass vertically down the small bow-rivets G G, so as to prevent any lateral play of the bows.

The bows thus are held on top of the handle and do not pass laterally through it, as is usual. By this construction of bow-clamp I make the rake very strong, and so as to outlast a half-dozen of the ordinary wooden rakes, while the expense is light and easily borne by the user.

I am aware that a harrow-clasp somewhat similar to mine has been described in Patent No. 241,402, and that said clasps are not broadly new; but What I desire to protect by Letters Patent is—

In wooden rakes, the combination, with the rake-bows, of the rivets G G and a clasp, E, having the bridge-holes $e^2$ $e^2$ to receive said rivets, whereby the bows are only riveted to the clasp and not to the handle, as shown and described.

In testimony whereof I affix my signature in presence of two witnesses.

JAMES A. SHAFER.

Witnesses:
JOHN C. FOX,
WARREN J. ATKINS.